United States Patent [19]

Roos et al.

[11] 4,432,014
[45] Feb. 14, 1984

[54] VIDEO-PHOTO FRAME SIZE COORDINATOR

[75] Inventors: Hartog J. Roos, Brookfield, Wis.; David I. Price, Lakewood, N.J.

[73] Assignee: General Electric Company, Schenectady, N.Y.

[21] Appl. No.: 261,854

[22] Filed: May 8, 1981

[51] Int. Cl.³ ............................................... H04N 5/32
[52] U.S. Cl. .................................... 358/111; 358/224; 378/99
[58] Field of Search ................. 358/97, 111, 183, 226, 358/224; 352/131; 378/98, 99, 100

[56] References Cited

U.S. PATENT DOCUMENTS

| | | | |
|---|---|---|---|
| 3,439,114 | 4/1969 | Taylor | 358/111 |
| 4,148,072 | 4/1979 | Vockenhuber | 358/224 |
| 4,185,198 | 1/1980 | Fujimoto | 358/111 |
| 4,245,244 | 1/1981 | Lijewski | 358/111 |
| 4,355,330 | 10/1982 | Fukui | 378/99 |

Primary Examiner—Joseph A. Orsino, Jr.
Attorney, Agent, or Firm—Ralph G. Hohenfeldt

[57] ABSTRACT

A system wherein a video camera views an optical version of an x-ray image and displays it in a circular pattern on a television screen and a photographic camera is arranged for simultaneously recording the image on film. A circuit is provided for generating signals that are added to the composite video signal for writing a bright outline of the photo camera frame on the television screen so that the user can determine what parts of the x-ray image are within the camera film frame boundaries.

5 Claims, 6 Drawing Figures

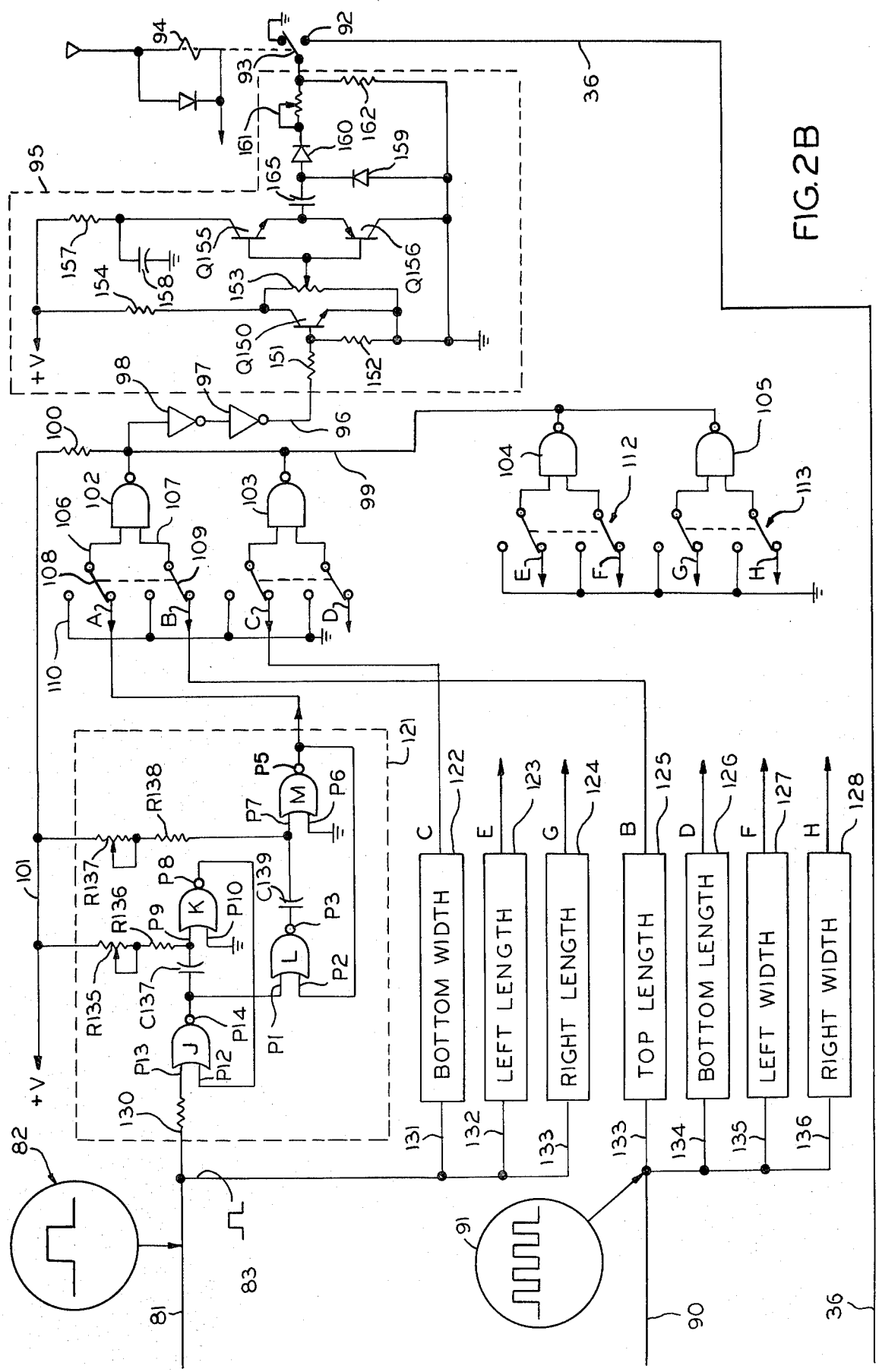

VIDEO-PHOTO FRAME SIZE COORDINATOR

BACKGROUND OF THE INVENTION

This invention is especially useful in x-ray image intensifier systems which display an x-ray image on a television monitor and also record a corresponding image with cine or photospot cameras on film. However, the new video-photo frame size coordinator is useful in any system where a user wants to be sure that a region of interest for photorecording viewed on the television monitor will fall within the filme frame boundaries of the camera.

The invention will be illustrated in connection with an x-ray image intensifier system. In a system of this type an x-ray image intensifier tube is used to convert the x-ray image to an optical image which appears on an output phosphor of the tube. An objective lens is disposed with its axis coincident with the axis of the phosphor. A television camera is arranged for viewing the optical image. The television camera is coupled to a television monitor that displays the image on its screen. Because the input photocathode and output phosphor of image intensifier tubes are usually circular, the image or field of view which appears on the monitor screen is also circular.

X-ray image intensifier systems also provide for photographic recording of the image observed on the television screen. In some systems, one or the other or both a cine camera and a photospot camera is or are arranged to film and photograph the optical image on the phosphor while its counterpart appears on the television screen. Up to the time that the present invention was made, however, there has been no practical system or method for providing the cardiovascular radiologist or other operator of image recording system with an accurate indication of the portion of the image viewed on the television screen that will actually be recorded on the cine or photospot film.

Basically, the problem results from the fact that different cine and photospot cameras may use lenses of various focal lengths. When a camera happens to use a lens of a particular focal length, its frame size, of course, will be fixed. Similarly, for any given installation, the diameter of the circular image appearing on the television screen will also be fixed. However, the diameter of the image on the screen may be and, usually is, larger than the film frame size in which case segments of the circular image lying outside of the frame boundaries will be cut off and not recorded on the film. This may result in an object such as the heart, which is of interest in its entirety at the moment, falling in part within the boundaries of the film frame and in part outside of the boundaries in the segment which is visible on the television screen but which is cut off insofar as film recording is concerned. Thus, if the user can only see the circular image on the television screen there is presently no way of being sure that one or the other or both of the cameras is framing the entire area of interest.

SUMMARY OF THE INVENTION

An object of the present invention is to provide the operator with the capability of displaying a bright outline on the television screen that corresponds to the boundaries of the film frame in the camera. The frame outline on the television screen is superimposed on the circular image so the operator can make a visual determination as to whether a region of particular interest in the image field is partially or entirely within the boundaries of the camera frame. If a part of the object is not in the frame, it is only necessary to shift the patient being examined in the x-ray beam until the anatomy of interest is completely within the camera frame as indicated by its outline which is appearing on the television screen.

The concept of displaying the camera film frame boundaries on the television screen along with the x-ray image is implemented herein with a video frame size display generator. In accordance with the illustrated embodiment of the invention, the composite analog video waveforms that are output from the television or video camera are input to the frame size display generator. In the first stage, the composite video waveform is processed so as to bring the top of the negative going vertical and horizontal sync pulses to a zero reference level such that the sync pulses always go more negative than zero and the video signal itself is always more positive than zero. The composite signal is then processed by a sync pulse separator and the output of the separator is a repeated sequence of vertical sync pulses each of which is followed by a train of horizontal sync pulses corresponding to the line rate of the television system which happens to be used and dependent upon the power line frequency from which the television system is operated. The vertical sync pulses are input to a group of four delay circuits in the illustrated embodiment and the horizontal sync pulses are input to another group of four delay circuits. The eight delay circuits generate position, length and width signals corresponding to the video signals or four clearly defined white lines which make up the film frame outline that will appear on the television screen. The outputs of the delay circuits are NANDed and fed into a video level and matching circuit. The output of this circuit, consisting of the position, length and width signals is then again summed with the composite video signal and fed to the television monitor for display of the x-ray image and film frame boundaries. By operating a switch, the operator can display or not display the frame on the screen.

How the foregoing and other more specific objects of the invention are achieved will be evident in the ensuing more detailed description of a preferred implementation of the invention which will now be set forth in reference to the drawings.

DESCRIPTION OF A PREFERRED EMBODIMENT

Figure 1:
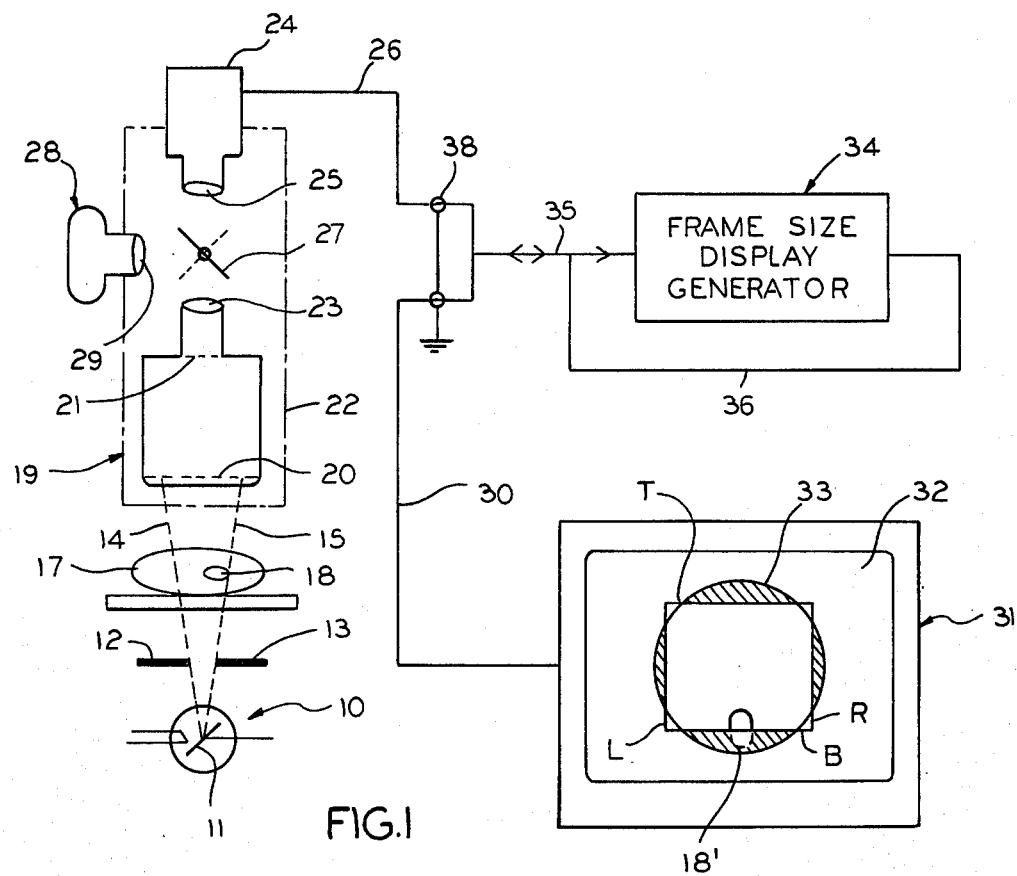
FIG. 1 is a schematic diagram of a diagnostic x-ray system that is provided with a television display and the new video-photo frame size coordinator.

The x-ray system depicted in FIG. 1 is conventional except for the frame size display generator. The system comprises an x-ray tube that is designated generally by the reference numeral 10. The power supply for the x-ray tube is omitted since it can be considered to be conventional. The tube has an anode target on which the electron beam is focused at a point marked 11 from which the x-ray beam emanates. At least four collimator blades two of which, 12 and 13, are shown, define the boundaries of the x-ray beam which is emitted from focal spot 11. Collimator blades 12 and 13 are movable toward and away from each other to define the boundaries of the x-ray beam which are indicated in dashed lines and marked 14 and 15. It will be understood that another pair of collimator blades, not shown, are usually arranged in proximity with the depicted pair to define the boundaries of the beam in directions perpendicular to the plane of the drawing.

The x-ray beam is projected through an x-ray transmissive table top 16 on which a patient 17 is supported for a cardiovascular or other examination. An organ such as the heart of the patient is represented by the object marked 18. The image resulting from differential attenuation of the x-ray beam by the varying density portions of the anatomy constitutes the input to an x-ray image intensifier tube which is designated generally by the numeral 19. The intensifier has an x-ray image input photocathode represented by the dashed line 20. Intensifier 19 converts the x-ray image to an electron image that impinges on a phosphor screen 21 which converts it to an optical image. Although the means are not shown, it will be understood that by adjusting certain voltages that are customarily applied to x-ray image intensifier tubes, the tube can be made to magnify a portion of the x-ray image and produce a corresponding optical version on phosphor 21.

The x-ray image intensifier is enclosed in a lighttight housing, having an x-ray permeable bottom, represented by the dashed-dot line 22. A collimating or objective lens 23 is arranged with its optical axis perpendicular to phosphor 21. A video camera 24 has the optical axis of its lens 25 coincident with the optical axis of objective lens 23. The video camera performs in the usual way to convert the optical image which it intercepts to composite analog video waveforms that are output to cable 26.

A semi-transparent mirror 27 is disposed in the optical path between the image intensifier and the video camera input lens 25. As is known, the light rays constituting the optical image penetrate through the mirror for being intercepted by the video camera. The mirror is oriented at an angle of 45° with respect to the optical axis of the image intensifier for reflecting the optical image laterally such as toward a cine recording camera 28 which is also mounted to the intensifier housing 22. The lens 29 of cine recording camera 28 intercepts the optical image and the camera produces a motion picture of the image when the camera is commanded to run. Semi-transparent mirror 27 is mounted for being pivoted 90° from the position in which it is shown by a solid line to a position corresponding with the illustrated dashed line. When in the dashed line position, of course, the optical image would be reflected laterally opposite of cine camera 28 such as would be the case if there were another camera such as a photo spot camera mounted on the opposite side of the image intensifier housing 22.

The composite video signal output from camera 24 is delivered by way of cables 26 and 30 to a television monitor that is designated generally by the numeral 31. Its display screen is marked 32. The x-ray image, whether magnified or not, is contained within the circle 33. The circular x-ray image field is, of course, observed by the operator. The field may include the heart which is of interest and is marked with the numeral 18' to show its correspondence with the heart 18 in the patient's body. The film frame boundaries for camera 28 are superimposed over the x-ray image. The top, bottom, left side and right side boundaries of the frame are respectively marked T, B, L and R. If the lines T, B, L and R represent the camera frame boundaries, it will be evident that the heart 18' will have a portion represented by solid lines falling within the frame for being recorded and another part represented by a dashed line that would be outside of the film framed boundaries and would not be recorded on the film. With no indication as to where the boundaries are, however, the operator could not be sure if all of the heart would fall within the camera frame boundaries.

The matter of coordinating what is viewed on the television screen with what is recorded on film by one or the other of the cameras has been so problematical that users have been known to resort to defining the frame boundaries by applying adhesive tape to the face of the television screen and to using a marking pen to define the boundaries. Locating the film frame broundaries in this manner is a trial and error procedure. Moreover, it is not convenient to erase the boundary markers when their presence is not desired. A further disadvantage of this scheme results from the fact that the image location on the television screen may drift a little in one direction or the other as the system ages. This requires relocating the physically applied markers from time to time. As will be evident in the description which follows, in accordance with the invention, the signals which are generated for producing the bright outline of the film frame on the television screen are superimposed on the composite video signals so that the frame outline will drift, if there is any drift in the television electronics, in perfect registry with the displayed x-ray image.

In FIG. 1, one implementation of a film frame size display generator is represented by the block marked 34. The composite video waveform from camera 24 is fed into the frame size generator by way of line 35. The output signals for generating the frame, and which are added to the composite waveform for writing the frame size on the television screen, are delivered by way of line 36 back into the circuit and sent to the television monitor 31 by way of cable 30. The circles 38 represent the shielding on the cables and they are grounded as is customary.

Figure 3:
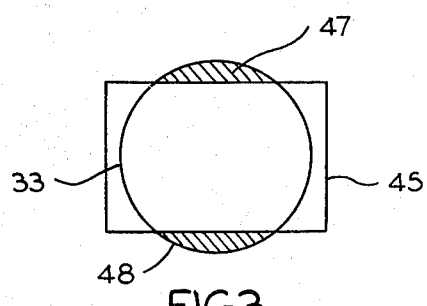
FIGS. 3 and 4 are diagrams for illustrating different types of overframing.
Figure 4:
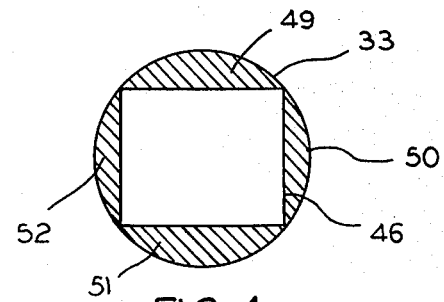

Before discussing the details of a preferred type of frame size generator 34, it should be noted that various overframing conditions can occur with different camera lenses and optical systems in the image intensifier system. FIG. 3 shows one type of overframing where the camera film frame size corresponds to the rectangle marked 45. The x-ray image is within the circle marked 33. The shaded segments 47 and 48 which actually contain image information would fall outside of the film frame and would not be recorded by the film in the camera. In FIG. 4 a different condition prevails. In this case the film frame 46 lies entirely within the X-ray image containing circle 33 in which case shaded segments of the image 49-52 would not be recorded and the information within these segments could be lost if the operator did not know they were outside of the film frame. Various other overframing conditions arise in practice.

Figure 2A:
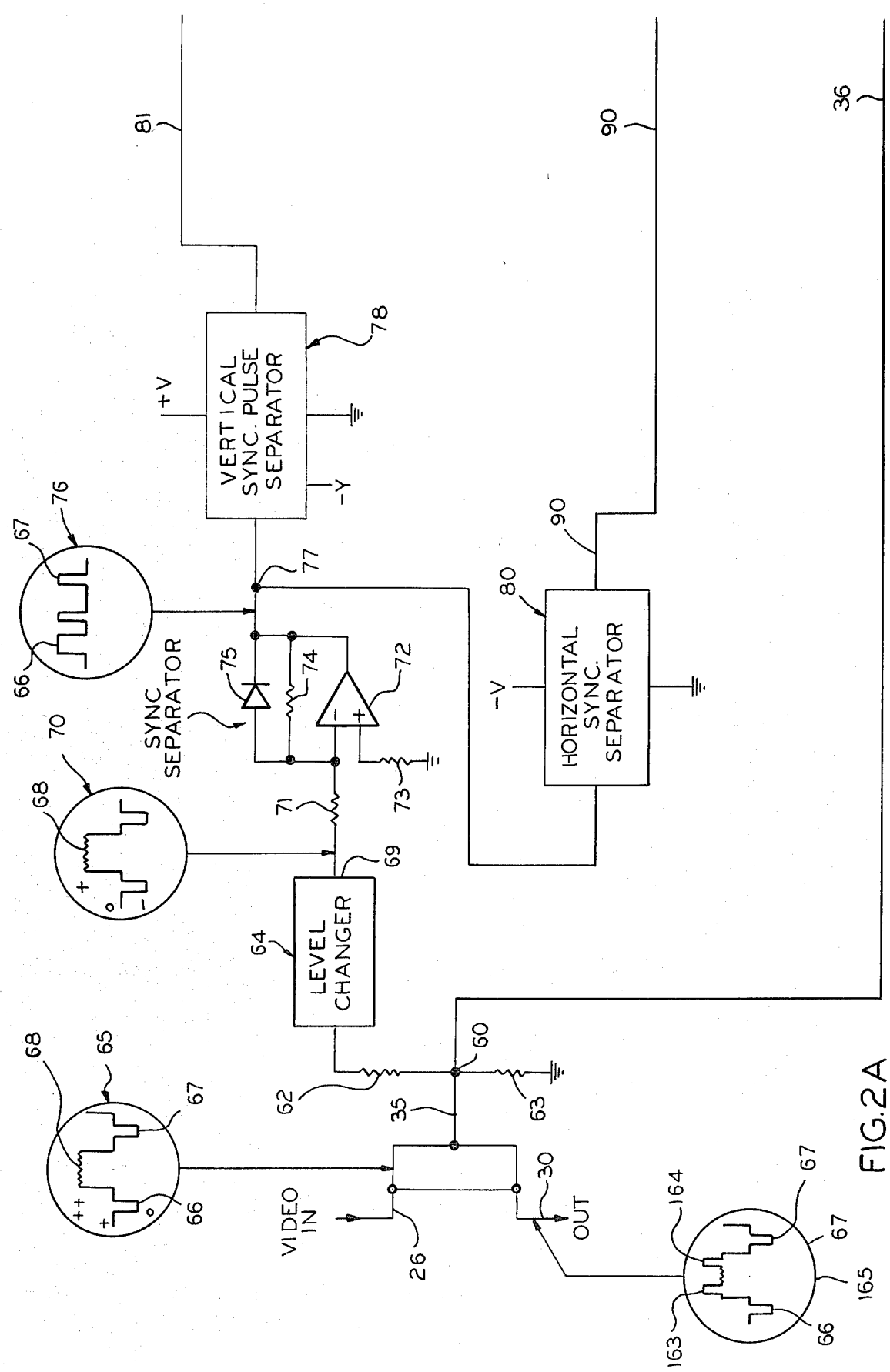
FIG. 2, comprised of parts 2A and 2B, is a circuit diagram of a frame size display generator.

The details of one manner in which a frame size display generator may be implemented is shown in FIG. 2 which will now be discussed. At the far left, the composite signal from video camera 24 comes in on line 26 as in FIG. 1. The composite video signal is fed into a summing point 60 that is intermediate of two resistors 61 and 62 comprising a voltage divider. The top of resistor 62 feeds the signal into a block marked 64 which contains a conventional signal level changer circuit. The composite video signal waveform input to block 64 is shown in the encircled inset marked 65. In this and in many TV systems, the vertical and horizontal sync pulses 66 and 67 fall below the video waveform 68 level. However, the tops of the sync pulses do not always lie at zero volts. In this and some other systems the bottoms of the sync pulses lie at zero volts as indicated by the zero level in the inset circle 65 and the top of the sync pulses are at a somewhat more positive level which could be 40 millivolts for example. The video signal 68 is even more positive as indicated by the + + sign. In such case, it is more difficult to separate the sync pulses from the video signals as required for the frame size display generator. The known circuit in block 64 is for level changing or bringing the positive waveform down to such level that the top of the sync pulses is always the zero base and the bottom of the sync pulses is always more negative. The waveform output on line 69 of level changer 64 is shown in the inset circle marked 70. It simply demonstrates that the positive video waveform 68 has been brought down to a level such that the top of the sync pulses is always at a zero base line and the bottom of the sync pulses is always more negative.

The output from level changer 64 is input through a resistor 71 to a sync pulse separator comprised of an operational amplifier 72 which essentially functions as a rectifier in conjunction with resistors 73, 74 and a diode 75. As is well known, the sync pulse separator strips the video signal 68 from the composite video waveform as demonstrated by the pulses 66 and 67 shown in the inset circle marked 76. Of course, it will be understood that each vertical sync pulse 66 is followed by a series of horizontal sync pulses 67. As is known, the number of horizontal sync pulses between a pair of vertical sync pulses determines the number of horizontal lines in the television monitor raster. The frame size display generator described herein can be used with a 525 line through 1023 line or any other number of lines in a raster as will be evident later when the frame size generator is more fully described. The vertical and horizontal sync pulse train output from the sync pulse separator is input, by way of line 77, to a vertical sync pulse only separator represented by the block 78. The pulse train output from the sync pulse separator is also input by way of line 79 to a horizontal sync pulse only separator represented by the block 80. The vertical and horizontal sync pulse separators 78 and 80 are commonly used in television circuits and need not be described in detail.

The output on line 81 from vertical sync pulse separator 78 is shown in the inset circle marked 82. The short duration vertical sync pulses shown in inset 82 occur at the television frame rate governed by the power line frequency. In this particular circuit, the vertical sync pulses are positive going as indicated by the one marked 83 in FIG. 2 adjacent output line 81 from the vertical separator 78.

The horizontal sync pulses are output from the horizontal sync pulse separator 80 on a line marked 90. The horizontal sync pulse train consists of positive going short duration pulses as shown in the inset circle marked 91. The horizontal pulses, of course, occurring between a pair of vertical sync pulses are equal in number to the number of raster or horizontal lines used in the television display. Typically, their rate is 15,750 Hz for 60 Hz power line frequency.

Now that the manner in which the vertical and horizontal sync pulses are obtained has been described, it is advisable to consider the character of the signals that are output from the frame size display generator 34 which accomplish optional writing of the photo frame size on the television screen 32 while or prior to displaying the x-ray image. The output line from the display generator is marked 36 in FIG. 2 as it is in FIG. 1. One may see that the composite video is on this line as well since it connects to summing point 60 at the video input. Line 36 at the output of the display generator connects to a terminal 92 that cooperates with a switch contact 93 which is operated by a relay coil 94. Switch contact 93 is shown in its grounding position. When it is desired to write the film frame outline on the television screen, relay 75 is energized by means of a manual switch, not shown, and relay contact 93 connects to terminal 92 so that the frame size information can be superimposed on the composite video signal which is present on line 36. The output signals on relay contact 93 are derived from a white video level and impedance matching circuit which is enclosed in a dashed boundary line marked 95. The circuit contained therein will be discussed later. For the present, it is only necessary to recognize that the input terminal 96 of this enclosed circuit 95 is connected by means of two inverters 97 and 98 to a common line 99. Line 99 connects to a pull-up resistor 100 by way of a line 101 to a positive voltage source at logical voltage level. At any time that line 99 switches from a high logical level to a low level, the input to the white level and impedance matching circuit goes low and this causes an output on relay switch terminal 92 of signals that are added to composite video for writing the film frame size on the television screen. In other words, as line 99 goes low at times dictated by parts of the circuitry which have not yet been described, a bright spot or bright line forming part of the frame outline will be superimposed or written over the x-ray image appearing on the television screen.

One may also observe at this juncture that there are four NAND gates 102, 103, 104 and 105 having their output terminals connected to common line 99. Hence, when any of the outputs of NAND gates 102-105 go to a logical low level, writing of some part of the frame outline will occur. NAND gate 102 has two inputs 106 and 107 which are, typically, connected by means of double-pole double throw switches including switch contacts 108 and 109 to signal input lines A and B. The switches are shown in the positions they are in when the frame size generator is in use. The inputs to NAND gate 102 can be switched to a ground bus 110 when the frame size generator is deactivated. The inputs to adjacent NAND gate 103 are connected through switch contacts 111 to input lines C and D. The inputs to NAND gate 104 are connected by means of a double-pole double-throw switch 112 to input lines E and F. The inputs to NAND gate 105 are connected through a similar switch to input lines G and H. The various NAND gates 102-105 are connected for NANDing pairs of signals. When logical high signals that can be NANDed occur at both inputs of any of the NAND gates 102-105, the gate will switch its output to a low state and bring common line 99 low to effect writing of some part of the film frame outline on the television screen.

Generation of the signals for writing the frame on a television screen will now be discussed. For this purpose, 8 delay circuits are provided. All of the circuits use the same circuit elements and they are connected in the same way although their values may be different. One of the delay circuits, enclosed within the dashed line rectangle 121 is shown in detail. The other delay circuits 122-128 are shown in block form. Delay circuits 121-124 are involved in producing delays relative to incoming positive going vertical sync pulses 83 which are simultaneous input by way of lines 130, 131, 132 and 133 through the delays in the upper group in the drawing. The outputs A, C, E and G of this group of delays connects to the correspondingly lettered inputs of the various NAND gates 102-105.

The positive going horizontal sync pulses from horizontal sync separator 80 that are output on line 90 are coupled to the inputs 133-136 of delay circuits 125-128, respectively. Every time a horizontal sync pulse occurs, there is a simultaneous input of it to all of the delay circuits 125-128. The outputs B, D, F and H of these delays connect to correspondingly lettered inputs of the various NAND gates 102-105.

Figure 5:
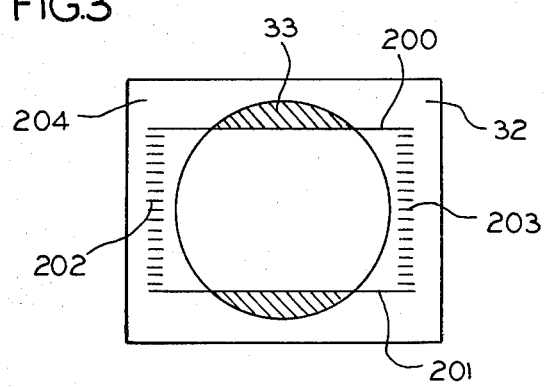
FIG. 5 is a diagram which is useful for explaining the invention.

Before proceeding with a further detailed explanation of how the delay circuits operate to effect frame size writing, some other functional features will first be examined in reference to FIG. 5. In this figure, the television display screen is marked 32. The circular displayed x-ray image is marked 33. The top line of the frame size which is to be written is marked 200 and the bottom line is marked 201. The left and right sides of the frame are marked 202 and 203. The left and right side lines 202 and 203 are comprised of short bright segments that coincide with raster lines and, as will be seen, these side lines can be given any thickness or width across the screen desired by making some adjustments in the delay circuits.

Referring further to FIG. 5, when a vertical sync pulse occurs, the writing beam of the television picture tube will start scanning horizontal raster lines for a field beginning at the point marked 204. As the writing beam sweeps down it of course is properly modulated for producing the information within the x-ray image circle 33. It will be evident that to generate the top line 200 of the frame, that a delay will be required following occurrence of the vertical sync pulse before the beam starts to write the brightened top film frame boundary line. After a predetermined additional time elapses, the bottom line 201 of the frame is written. Writing of top line 200 is initiated when the horizontal sync pulse corresponding to the line occurs. However, there must be a delay in the horizontal direction from the left edge of the screen since the start of the top line should not occur until the writing beam is deflected inwardly to the point where the vertical left side line 202 begins. Otherwise, top line 200 would extend all the way across the television screen. As can be seen, there is a delay interposed after each horizontal sync pulse occurs so that the successive segments or dots constituting vertical line 202 all begin at the desired distance from the left of the television screen. To form one of the segments constituting line 202, of course, the writing beam is modulated bright and then down to normal level and the segment is complete. When a horizontal sync pulse, followed by a delay occurs for writing any one of the segments in the left side line 202, the same horizontal sync pulse causes another delay to commence which terminates when the beam sweeps to right side vertical line 203 where it modulates bright, writes a short segment or dot and returns to normal brightness again as it sweeps to the right edge of the screen. It will be evident that to start writing any part of the frame, the desired vertical and horizontal locations of the writing beam will have to coincide and be NANDed to effect writing.

The details of a typical delay circuit in the dashed line rectangle 121 in FIG. 1 will now be considered. This vertical time delay circuit relates to writing the top line 200 of the film frame outline depicted in FIG. 5. The circuit has two RC timing circuits. One consists of a variable potentiometer R135 in series with a fixed resistor R136 and a capacitor C137. The potentiometer connects to positive logic voltage supply line 101. By way of example and not limitation, the maximum resistance of R135 may be on the order of 500 kilohms, the resistance of R136 may be 10 kilohms and C137 may have a value of 0.33 mF in a 525 horizontal raster line TV system. This adjustable timing circuit determines the amount of delay which will occur after a vertical sync pulse occurs before writing of horizontal top line 200 begins at the desired vertical position. In other words, it controls the amount of vertical deflection required before writing the top line in the width dimension of the screen begins.

The other timing circuit consists of a variable potentiometer R137 in series with fixed resistor R138 and a capacitor C139. The setting of adjustable potentiometer R137 determines the width in the horizontal direction of the top line. By way of example and not limitation, the maximum resistance of R137 may be 250 kilohms, that of R138 1 kilohm and C139 may have a value of 0.01 mF. The delay circuit 121 also includes an integrated circuit NOR gate quad comprised of NOR gates J, K, L and M. The input and output pins of the NOR gates are given numbers and a prefix letter P.

The only time the output pins of the NOR gates will switch to a logical high state is when both of their inputs are in a logical low state. When either or both of their inputs are high, their outputs will always be in a logical low state. First let us consider conditions right before a high going or positive going vertical sync pulse 83 is input to delay circuit 121. Under this condition, output line 81 from vertical sync pulse separator 78 is still low and input pin P13 of NOR gate J will be low. Since input P9 of NOR gate K is high at the moment, due to it being connected to dc power supply through R135 and R136, the output pin P8 of gate K will be low. This means that both inputs, P13 and P12 to gate J are low at the moment in which case output pin P14 of gate J is high and capacitor C137 cannot charge from dc source line 101. The top line width determining capacitor C139 also will not be charging before occurrence of a positive going vertical sync pulse. C139 will not begin to charge until later when the vertical position timing circuit R135, R136 and C137 has timed out. C139 does not charge because output pin P3 is still high. This results from input pin P1 of NOR gate L being low and input pin P2 being low. Pin 2 is low because output pin 5 of gate M is low due to its input pin 7 being connected to positive or a high dc source voltage through R138 and R137.

Now assume a positive going vertical sync pulse 83 occurs and is input to P13 of NOR gate J. At the start of the sync pulse, input P13 of gate J will go high and cause output P14 to switch to a low logical level. This provides a path through position potentiometer R135 and R136 for C137 to begin charging and thus initiate the delay interval following a vertical sync pulse at the end of which writing the top line of the film frame outline can begin when another condition is met.

Input P9 of NOR gate K is held low while C 137 is charging so the gate K output P8 and input P12 of gate J are high. The charging time of C137 is longer than the vertical sync pulse width, thus providing a low going pulse at output P14 of gate J which has a longer duration than the vertical syn pulse. In other words, P14 stays low even after the short sync pulse disappears. Output pin P5 of gate M will be low during absence of the presently stretched sync pulse from output P14 of gate J and top frame line writing can not begin yet. Output P3 of gate L will be low during the absence of the stretched sync pulse, that is, before output P14 of gate J goes low. When P14 went low at the beginning of the stretched sync pulse, P1 of gate L also goes low and since P2 would then be low, output P3 of gate L will be high. Hence, width control capacitor C139 will be uncharged during the stretched sync pulse. Position signal output P5 of gate M will stay low.

Upon termination of the stretched sync pulse, input P1 to gate L will go high and since its input P2 is low due to output P5 of gate M being low, the output P3 of gate L will go low. Now width controlling capacitor C139 can charge through R137 and R138. During the charging time of C139, input P7 of gate M will be pulled low and output P5 of this gate will go high, thus fulfilling one of two conditions that must be fulfilled before writing of the top line of the frame outline can begin. The high signal on P5 is supplied to the A input of NAND gate 102. Output P5 will hold input P2 to gate L high and output P3 low for the charging period of C137, thus establishing the duration of the width of horizontal length of top frame line 200.

The other condition that must be met before writing of the top line of the frame outline begins is that input B of NAND gate 102 must be high along with input A. B is caused to go high when the distance from the left edge of the screen at which writing the horizontal top frame line is determined. The horizontal delay is determined with horizontal delay circuit 125. It has an input 133 for positive going horizontal sync pulses. It has a timing circuit for producing a first delay period similar to R135, R136 and C137 in delay circuit 121 except that its time constant can be much shorter. It also has a timing circuit similar to R137, R138 for producing a second delay period whose time constant can be the same. When there is input to the horizontal sync pulse to delay circuit 125 that is coincident with the top frame line being reached, the scanning beam is at the far left edge of the television screen. Then the first delay period is commenced by virtue of the counterpart of C137 beginning to charge. Output B of delay circuit 125 remains low during this first delay period. The scanning beam moves from the left edge of the screen toward the right during the first delay. At the end of the first delay, the counterpart of C139 starts to charge and the second delay period commences. During the charging period, the counterpart of output P5 is high which means output B of delay circuit 125 is high. Since input A to NAND gate 102 is still high both inputs to this gate are high and the output of NAND gate 102 is low. Common line 99 is also low at which time the scanning beam is modulated bright to write the top line. When C139 becomes fully charged to end the second delay, output B of delay circuit 125 goes low again as does the B input the NAND gate 102. Hence, its output goes low and the length of the horizontal top line in the width direction of the screen is determined.

It is necessary to write the vertical lines on the television screen that represent the left and right sides of the frame outline. Vertical delay circuit 123 and horizontal delay circuit 127 are involved in writing the left side line 202. Left vertical delay circuit 123 has an input 132 for the positive going vertical sync pulses. Delay circuit 123 is similar to delay circuit 121 except it has different time constants. When the vertical sync pulse under consideration occurred, delay circuit 123 produces a delay period corresponding to the time elapsed for the writing beam to deflect vertically to the horizontal raster line at which writing of the left side vertical frame line 202 is to begin. As in each case the first delay period commences when the equivalent of C137 begins to charge and ends when it is charged. During this delay output E is low. At the end of the first delay, the equivalent of C139 begins to charge, commencing the second delay period. As soon as C139 begins to charge output E goes high, thus making input E of NAND gate 104 high. Output E stays high until C139 becomes fully charged. The charge or second delay period determines the length of the left side line of the frame outline on the television screen as will be evident soon.

At the time the first delay period expired in circuit 123 there was a horizontal sync pulse input on line 135 to left horizontal delay circuit 127. At this time the electron scanning beam is at the left edge of the screen. The counterpart of capacitor C137 begins to charge to start the first delay period during which the beam is scanning in from the left edge toward the right edge. During the first delay period output F of delay circuit 127 stays low. The first delay period allows the beam to scan in to the point where writing a dot or segment constituting a part of the vertical left side frame line 202 is to begin. When the first delay period expires, the counterpart of C139 begins to charge to begin the second delay period. When it begins output F of delay circuit 127 goes high. Now inputs E and F to NAND gate 104 are both high and its output and common line 99 go low, causing the beam to be modulated bright. The second delay period is very short so that usually a dot or a very short bright segment will be written.

As further horizontal sync pulses are input to left horizontal delay circuit 127 the process described in the last paragraph just repeats. That is, output F is low when the sync pulse occurs, there is the same first delay period to let the beam scan in from the left edge of the screen, then F goes high for the second short delay period and then goes low again so dots or segments forming left side vertical line 202 will be formed.

Eventually output E from left vertical delay circuit wll go low to define the end of the vertical left side line. This results from input E to NAND gate 104 going low and its output going high if it has one low input.

Writing the vertical line comprised of dots or segments for the right side 203 of the frame is accomplished in the same manner as the left side except that the right vertical delay circuit 124 and the right horizontal delay circuit 128 cooperate. The right vertical delay circuit responds to input of the particular vertical sync pulse by producing the first and second delay periods as in the previous cases. At the end of the first delay output G of circuit 124 goes high and stays high for the amount of time that is to be used for writing the length of the vertical line that comprises the right side 203 of the frame outline. When output G goes high, so does the corresponding input to NAND gate 105 but its output remains low. The horizontal sync pulse input on line 136 to right side horizontal delay circuit following or coincident with G going high starts the first delay period which lets the scanning beam move to the right where the vertical line is to be written at which time output H goes high for a moment to cause writing of a bright segment or dot for the right side on the horizontal line corresponding to the first horizontal syn pulse. The process just repeats for ensuing horizontal sync pulses until output G goes low upon expiration of its second delay period. Then the output of NAND gate 104 would be held high so no more dots or segments could be written on successive horizontal raster lines.

Writing the bottom line 201 of the frame outline involves use of bottom vertical time delay circuit 122 and bottom horizontal time delay circuit 126. This operation need not be explained since it is substantially the same as what occurs in connection with writing the top line 200. The only difference is that the first delay is long enough to let the writing beam reach a lower position on the screen before writing the horizontal bottom line can occur.

It should be noted that by adjusting the potentiometers corresponding to R137 in horizontal delay circuits 127 and 128 segments of various horizontal lengths or widths can be produced varying from dots to long segments. This means that the thickness or width of the vertical left and right side lines can be adjusted to the satisfaction of any particular user. The length of the top and bottom frame lines can also be selected by adjusting the potentiometers R137 in delay circuits 121 and 126. The vertical position of the top and bottom lines can be selected by adjusting potentiometers R135 in circuits 121 and 122. Flexibility is so great that rectangular and square frames with open corners can be produced and the frames may be located anywhere in relation to the circular x-ray image.

The white level and matching circuit within dashed lines 95 is for adding the writing pulses to to composite video and for impedance matching. There are two inverter buffers 98 and 97 connecting common line 99 to the input 96 of level and matching circuit 95. Upon simultaneous occurrence of two high inputs on any of NAND gates 102–105, input 96 will go low to effect writing frame information. A transistor Q150 is in the circuit with an input resistor 151 and a biasing resistor 152. There is a potentiometer resistor 153 shunted across the collector to emitter of Q150. A collector resistor is connected to a 15 volt positive dc source line. When a frame write pulse is fed to the base of Q150 it turns off and provides a voltage signal to the wiper of the potentiometer. Adjusting this potentiometer provides for white level control of the frame boundary lines.

The signal on the wiper provides proper bias to oppositely driven transistors Q155 and Q156 which are in series between the dc source terminals with collector resistor 157 to which a filter capacitor 158 is connected. The adjustable signal level is coupled by means of a capacitor 166 from intermediate the emitters of Q155 and Q156 to the output circuit including diode 159 and isolating diode 160. A divider consisting of a potentiometer 161 and resistor 162 permits proper matching.

Typical frame write pulses 163 and 164 are shown added to one line of composite video in the inset circle marked 165 at the far left of FIG. 2.

The manner in which the frame size display is set up and calibrated will now be described primarily in reference to FIG. 1. The first step is to remove the film magazine from the camera 28. A ground glass plate is then placed behind the frame aperture where the film would normally be located. The x-ray source is then energized to produce a low energy x-ray beam. A phantom, simulating a body, could be situated in the beam at the location of the body 17 in FIG. 1. Having the optical image appearing on the ground glass, the collimator blades 12 and 13 and their orthogonally related cooperating pair are moved in until they are coincident or tangent with the margins of the film frame. The x-ray image intercepted by video camera 24 is also similarly collimated at this time. Hence, the image or field presented on the television screen will correspond with the boundaries of the film frame aperture. In other words, there will be upper and lower and left and right lines defining the boundaries of the film frame displayed on the television screen. Reference marks or tape strips are then applied coincident with the edges of the frame on the screen and the x-ray beam is turned off. Frame size display generator is then turned on and the potentiometers in FIG. 2, such as R135 and R137 are adjusted until the frame boundaries on the screen coincide with the markers. At this time the frame size corresponds with the film gate aperture in the camera. From that point on, anytime a circular x-ray image is on the television screen, the frame size display generator can be turned on to determine if the particular anatomy of interest falls within the frame outline such that it will be recorded on film when the camera is operated. If the anatomy of interest lies outside of the frame boundaries, it is only necessary to shift the patient by moving the x-ray table top 16 to assure that what is observed within the frame outline will be captured on the film.

Once the setup has been made for a particular camera and its lens system, there need be no concern about the frame outline shifting relative to the x-ray image due to drift in the electronics of the television system. The reason is that, in the described system, the signals that are used to write the frame size are based on and restored to the composite video signal delivered by the video camera. Thus, the frame outline and displayed x-ray image will always drift together, or in reality, maintain the same relationship to each other.

Although one implementation of the frame size generator in an x-ray fluoroscopic system has been described in detail, such description is intended to be illustrative rather than limiting, for the concept of coordinating what is visualized on the television screen with what is recorded on film can be variously implemented so that the invention is to be limited only by interpretation of the claims which follow.

We claim:

1. A system comprising an x-ray image intensifier for converting an x-ray image that is contained within a circular field to a corresponding circular optical image that appears on the output phosphor of the intensifier, a photographic camera arranged for recording the optical image on film, the area on the film on which said image is recorded being defined by the straight-line boundaries of a frame, a video camera arranged for simultaneously intercepting said circular optical image field, said video camera being operative to convert said image to composite signals including vertical and horizontal sync pulses and video waveform signals, a raster scanned television monitor responsive to being supplied with said composite signals by displaying the image in a circular field on its screen, and, the improvement for allowing an observer to determine if a region in the circular image field displayed on said screen is within the boundaries of the non-circular photographic camera frame, comprising:

means that are selectively operable to generate signals representative of at least portions of the straight-line boundaries of the photographic camera frame, and means for supplying the generated signals to said television monitor concurrently with said composite signals for enabling said circular image field and said straight-line frame boundaries to be displayed simultaneously on said screen with the frame boundaries superimposed on the circular image so that a user may determine by observation of the display screen only whether or not a particular region of interest lying within the circular image field also lies within the frame boundaries of the photographic camera, said means that are selectively operable to generate signals representative of straight line boundaries of one of a rectangular or square photographic camera frame, comprising:

means for stripping the horizontal and vertical sync pulses from said composite video signals, a plurality of delay devices having means for adjusting their delays, some of said devices having an input for vertical sync pulses and others having an input for horizontal sync pulses, each of said delay devices having output means for delayed signals constituting gating signals, a plurality of gates each of which has at least two input means for selected gating signals, said gates each having output means connected in common such that when the outputs of all of the gates are in the same logic state said common connection will be at one logic state and when any of the gate outputs are in a state different than any other said common connection will be at another logic state, means responsive to the logic state of said common connection by producing corresponding write signals and means for superimposing said write signals on said composite video signal for said write signals to increase the intensity of the television monitor scanning beam to define an outline in the raster corresponding to the size of the photographic camera frame, the delay devices being adjusted such that they provide output signals to said gates in combinations that result in writing said outline.

2. The improvement set forth in claim 1 wherein the displayed photographic camera frame boundaries comprise top and bottom horizontal lines in parallelism and spaced apart vertically on said screen, and the circular image field extends above the top line and below the bottom line by equal amounts.

3. A system comprising an x-ray image intensifier for converting an x-ray image to a corresponding optical image, a photographic camera arranged for recording the optical image on film, the area on the film on which said image is recorded being defined by the boundaries of a frame, a video camera arranged for simultaneously intercepting said optical image, said video camera being operative to convert said image to composite signals including vertical and horizontal sync pulses and video waveform signals, a raster scanned television monitor responsive to being supplied with said composite signals by displaying the image on its screen, and, the improvement for allowing an observer to determine if a region in the displayed image is within the boundaries of the frame, comprising:

means for separating the vertical and horizontal sync pulses from the composite video signal, means operative to separate said sync pulses from each other an to output vertical and horizontal sync pulses, respectively, a first plurality of vertical sync pulse responsive timing means having input and output means, said timing means being responsive to simultaneous input of a vertical sync pulse by measuring first and second successive delay periods, each first delay period beginning upon occurrence of the vertical sync pulse and terminating later, and each second delay period beginning when the first one terminates and terminating later, the output means of each timing means changing from one signal level state to another state when said second delay period begins and changing back to said one state when said second delay period terminates, a second plurality of horizontal sync pulse responsive timing means having input and output means and being responsive to simultaneous input of horizontal sync pulses occurring coincident with vertical sync and in sequence after the vertical sync pulse by measuring first and second successive delay periods, each first delay period beginning upon occurrence of the respective horizontal sync pulses and terminating later, and each second delay period beginning when the first one terminates and terminating later, the output means of each timing means changing from one signal level state to another state when said second delay period begins and changing back to said one state when the second delay period terminates, four gate means each of which has at least two signal inputs and a signal output, any gate means output being in one signal state when both of its inputs are in the same state and being in another state when its inputs are not in the same state, one input of each gate means being coupled to an output means of one timing means in the first plurality of timing means and the other input being coupled to an output means of one cooperating timing means in the second plurality of timing means, respectively, said gate means outputs being connected to a common junction, such that when the inputs of any gate means become the same the output of that gate means and the junction will switch to the one output state corresponding to a write signal and thereby effect writing of parts of said frame outline on said screen, the first of said vertical sync pulse responsive timing means providing its first delay period for permitting said raster scan beam to move vertically from the top of the screen where it is when the vertical sync pulse occurs to the horizontal raster line on which the top line of said frame outline is to be written and then switching its output to said one state to provide one input to the first of said gate means to establish one condition for writing that persists for the duration of the second delay period to thereby establish the width dimension of the top line of the frame, the cooperating first horizontal sync pulse responsive timing means responding to the horizontal sync pulse corresponding to said top line providing its first delay period for permitting said beam to move from an edge of the screen to the point where writing the top line is to start and then switching its output to said one state to provide the other input to the first of gate means to establish the other conditions for writing for the duration of the second delay period, the second of said vertical sync pulse responsive timing means responding providing its first delay period for permitting said raster scan beam to move vertically to the horizontal raster line on which the bottom line of said frame outline is to be written and then switching its output to said one state to provide input to another of the gate means and establish one condition for writing that persists for the duration of its second delay period to thereby establish the width dimension of the bottom line of the frame, the cooperating second of said horizontal sync pulse responsive timing means responding to the horizontal sync pulse corresponding to the bottom line providing its first time delay for permitting said raster scan beam to move from an edge of the screen to the point where writing said bottom line is to start and then switching its output to said one state to provide the other input to the second gate means to establish the other condition for writing for the duration of the second delay period, the third and fourth vertical sync pulse responsive timing means cooperating respectively with the third and fourth horizontal sync pulse responsive timing means for writing the left and right vertically extending side frame lines on the screen, the outputs of both third timing means being coupled to the respective inputs of the third gate means and the outputs of both fourth timing means being coupled to the respective inputs of the fourth gate means, each of said third and fourth vertical sync pulse responsive timing means providing their first delay periods for permitting said raster scan beam to move to the horizontal raster line from which the left and right side vertical frame lines, respectively, should begin to be written and then each of the timing means switching its output to said one state to provide one input to each of the third and fourth gate means, respectively, to establish one condition for writing for the durations of the second delay periods to thereby establish the vertical dimension of the side lines of the frame, the respective cooperating third and fourth horizontal sync pulse responsive means responding to horizontal sync pulses corresponding to successive horizontal raster lines by providing their first delay periods for permitting the raster scan beam to move to the successive locations where a dot or segment for forming the left and right vertical side lines, respectively begin at which time the respective timing means switch their output means to said one state for to provide the other inputs to the respective third and fourth gate means to establish the other condition for writing successive dots or horizontal segments for the durations of the second delay periods.

4. The apparatus claimed in claim 3 including two circuits in each of which there is a switch, said circuits coupling the respective output means of a vertical sync pulse responsive timing means and a cooperating horizontal sync pulse responsive timing means to the respective inputs of a gate means, opening of said switches prohibiting simultaneous inputs to said gate means to prohibit writing of a selected one of said top, bottom, left side or right side frame lines on said screen.

5. The apparatus as claimed in claim 3 wherein a typical timing means comprises:

first and second pairs of NOR gates each having two inputs and an output, each gate responding to both of its inputs being at a low logical level by switching its output to a high logical level and responding to one or both of its inputs being at a high logical level by switching its output to a low logical level, each output being capable of sinking current when at its low logical level, one input of the first gate in said first pair being connected to input a signal corresponding to a selected one of said vertical or horizontal sync pulses, the other input to the first gate being connected to the output of the second gate in the first pair, a first capacitor connected between the output of said first gate in the first pair and one input of the second gate in the first pair and the other input to said second gate being connected for being held in at low logical level, a charging circuit including a variable resistor in a circuit between a power supply and the junction of said capacitor and said other input to said second gate, said capacitor beginning to charge when the output of the first gate goes low in response to input of a sync pulse, said first delay period in the successive periods corresponding to the charging time of the capacitor, completion of charging of said capacitor causing the output of the second gate to go low to thereby cause the output of the first gate to go high, one input of the first gate in the second pair being connected to the output of the first gate in the first pair, the last named one input going high when the output of the first gate in the first pair goes high, the output of the second gate in the second pair being connected to the other input of the first gate in said second pair, a second timing capacitor connected between the output of the first gate and one input of the second gate, the other input to the second gate being connected for being held at a low logical level, a charging circuit including a variable resistor connected in a circuit between a power supply and the junction of said capacitor and said one input of the second gate in the second pair to thereby hold the output of the second gate in the second pair low initially, said first gate in said second pair responding to its one input going high when said first capacitor is completely charged by switching its output low for enabling said second capacitor to being charging for initiating the second of the successive delay periods, during the charging period of said second capacitor the one input to the second gate being pulled low to cause the output of the second gate in the second pair to go high to thereby provide one of the signals required for writing a frame line on the screen.

* * * * *

UNITED STATES PATENT AND TRADEMARK OFFICE
CERTIFICATE OF CORRECTION

PATENT NO. : 4,432,014

DATED : February 14, 1984

INVENTOR(S) : Hartog J. Roos and David I. Price

It is certified that error appears in the above-identified patent and that said Letters Patent are hereby corrected as shown below:

column 15, line 50, "ot" should read ---of---.

Signed and Sealed this

Twenty-sixth Day of March 1985

[SEAL]

Attest:

DONALD J. QUIGG

Attesting Officer

Acting Commissioner of Patents and Trademarks